United States Patent
Kim et al.

(10) Patent No.: US 11,467,460 B2
(45) Date of Patent: Oct. 11, 2022

(54) ELECTROCHROMIC FILM AND AN ELECTROCHROMIC DEVICE COMPRISING THE SAME

(71) Applicant: LG CHEM, LTD., Seoul (KR)

(72) Inventors: Yong Chan Kim, Daejeon (KR); Ki Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 321 days.

(21) Appl. No.: 16/604,830

(22) PCT Filed: Apr. 23, 2018

(86) PCT No.: PCT/KR2018/004671
§ 371 (c)(1),
(2) Date: Oct. 11, 2019

(87) PCT Pub. No.: WO2018/199569
PCT Pub. Date: Nov. 1, 2018

(65) Prior Publication Data
US 2020/0166819 A1    May 28, 2020

(30) Foreign Application Priority Data

Apr. 24, 2017 (KR) .................. 10-2017-0052046
Apr. 19, 2018 (KR) .................. 10-2018-0045422

(51) Int. Cl.
*G02F 1/153* (2006.01)
*G02F 1/155* (2006.01)
(Continued)

(52) U.S. Cl.
CPC ........ *G02F 1/1533* (2013.01); *C01B 21/0821* (2013.01); *C03C 17/3435* (2013.01);
(Continued)

(58) Field of Classification Search
CPC . G02F 1/15; G02F 1/155; G02F 1/153; G02F 1/1533; G02F 1/1523;
(Continued)

(56) References Cited

U.S. PATENT DOCUMENTS 7,428,090 B2 * 9/2008 Fukazawa ............ G02F 1/1524
359/265
2005/0248824 A1  11/2005 Fukazawa et al.
(Continued)

FOREIGN PATENT DOCUMENTS

CN    103582844 A    2/2014
CN    105074559 A    11/2015
(Continued)

OTHER PUBLICATIONS

International Search Report (PCT/ISA/210) issued in PCT/KR2018/004671, dated Jul. 27, 2018.
(Continued)

*Primary Examiner* — Jie Lei
(74) *Attorney, Agent, or Firm* — Birch, Stewart, Kolasch & Birch, LLP

(57) ABSTRACT

An electrochromic film and an electrochromic device including the electrochromic film are disclosed. The electrochromic film includes an electrochromic layer and a passivation layer on one side of the electrochromic layer. The coloration level of the electrochromic film is different from the coloration level of the passivation layer. The film may change optical properties as a result of electrochromism according to an electrochemical reaction. The electrochromic film and the electrochromic device have improved electrochromism, excellent durability, excellent color-switching speed, and stepwise control of optical properties.

18 Claims, 4 Drawing Sheets

(51) Int. Cl.
*C09K 9/00* (2006.01)
*C01B 21/082* (2006.01)
*C03C 17/34* (2006.01)

(52) U.S. Cl.
CPC ............... *C09K 9/00* (2013.01); *G02F 1/155* (2013.01); *C03C 2217/948* (2013.01); *C03C 2218/155* (2013.01); *G02F 2001/1536* (2013.01)

(58) Field of Classification Search
CPC ...... G02F 1/1525; G02F 1/1521; G02F 1/157; G02F 1/163; G02F 1/133; G02F 1/13318; G02F 1/07; G02F 2001/1536; G02F 2203/11; G02F 2203/02; C01B 21/082; C01B 21/0821; C09K 9/00; C03C 17/3435; C03C 2217/948; C03C 2218/155; G09G 3/19; G09G 3/38
USPC ................ 359/265–275, 242, 245, 296, 609; 345/89–103, 49, 105
See application file for complete search history.

(56) References Cited

U.S. PATENT DOCUMENTS

| | | |
|---|---|---|
| 2007/0076286 A1 | 4/2007 | Sung et al. |
| 2009/0027758 A1* | 1/2009 | Koshida ............... G02F 1/1524 359/274 |
| 2009/0067031 A1 | 3/2009 | Piroux et al. |
| 2012/0038967 A1 | 2/2012 | Copeland et al. |
| 2012/0309244 A1 | 12/2012 | Solarski et al. |
| 2014/0022621 A1 | 1/2014 | Kailasam et al. |
| 2016/0026058 A1 | 1/2016 | Lee et al. |
| 2016/0291357 A1 | 10/2016 | Min et al. |
| 2019/0137841 A1* | 5/2019 | Koo ......................... G09G 3/19 |
| 2020/0255723 A1* | 8/2020 | Kim ..................... G02F 1/1524 |

FOREIGN PATENT DOCUMENTS

| | | |
|---|---|---|
| EP | 1 434 083 A2 | 6/2004 |
| EP | 1 282 922 B1 | 11/2009 |
| JP | 5-80357 A | 4/1993 |
| JP | 8-26250 A | 1/1996 |
| JP | 2004-205628 A | 7/2004 |
| JP | 2005-91788 A | 4/2005 |
| JP | 2007-108750 A | 4/2007 |
| JP | 2008-203740 A | 9/2008 |
| JP | 2009-83183 A | 4/2009 |
| JP | 2014-94448 A | 5/2014 |
| KR | 10-0526640 B1 | 1/2006 |
| KR | 10-2007-0034431 A | 3/2007 |
| KR | 10-0758379 B1 | 9/2007 |
| KR | 10-2008-0070657 A | 7/2008 |
| KR | 10-2014-0049790 A | 4/2014 |
| KR | 10-2014-0086327 A | 7/2014 |
| KR | 10-2015-0105249 A | 9/2015 |
| KR | 10-2015-0115818 A | 10/2015 |
| KR | 10-2016-0011338 A | 2/2016 |
| WO | WO 2006/101224 A1 | 9/2006 |
| WO | WO 2014/124303 A2 | 8/2014 |

OTHER PUBLICATIONS

European Search Report for Appl. No. 18 791 911.3 dated Nov. 17, 2020.

European Search Report for Appl. No. 18791911.3 dated Feb. 21, 2020.

* cited by examiner

[Figure 1]
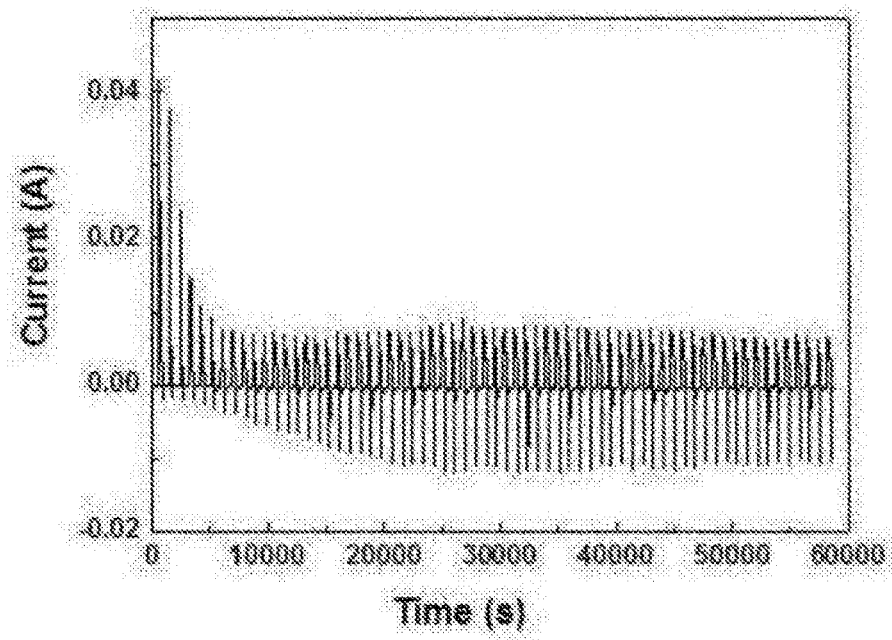
[Figure 2a]
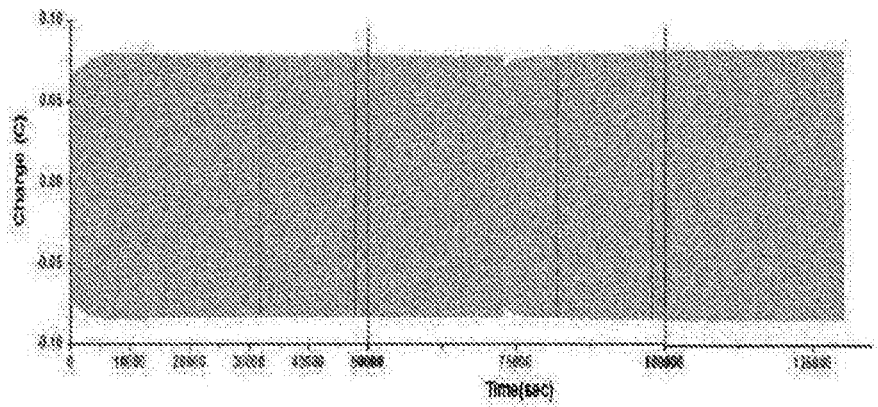

[Figure 2b]
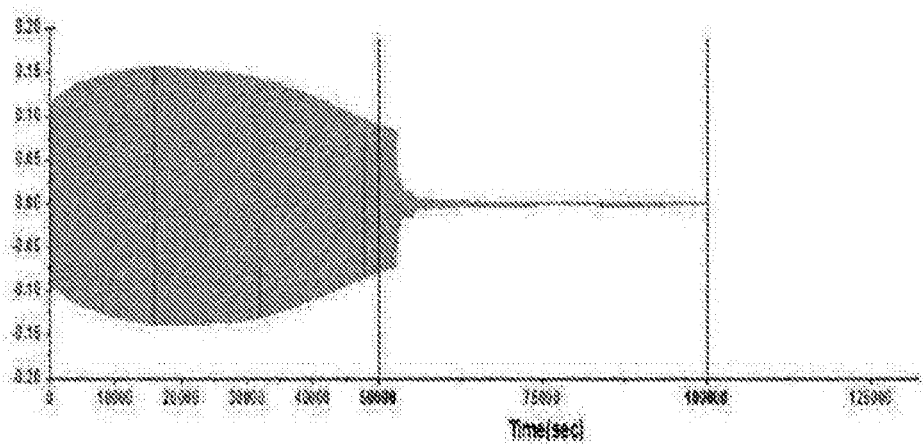
[Figure 3a]
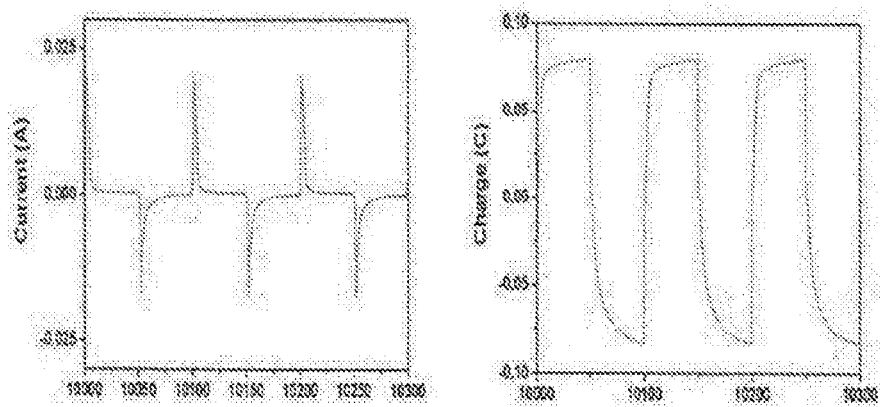
[Figure 3b]
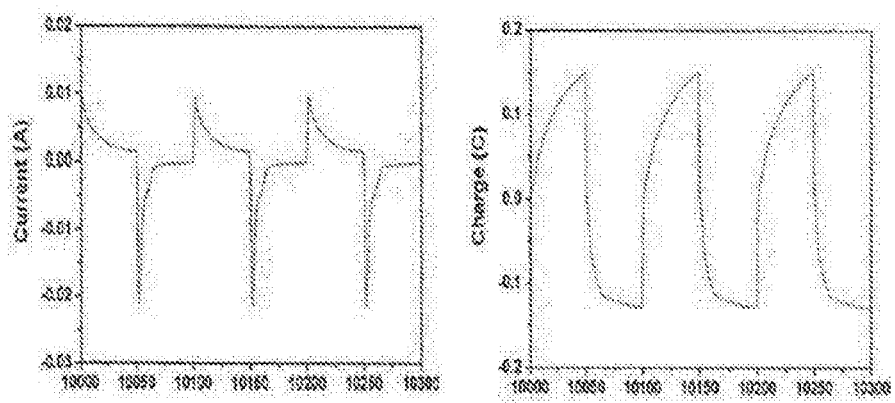

[Figure 4]
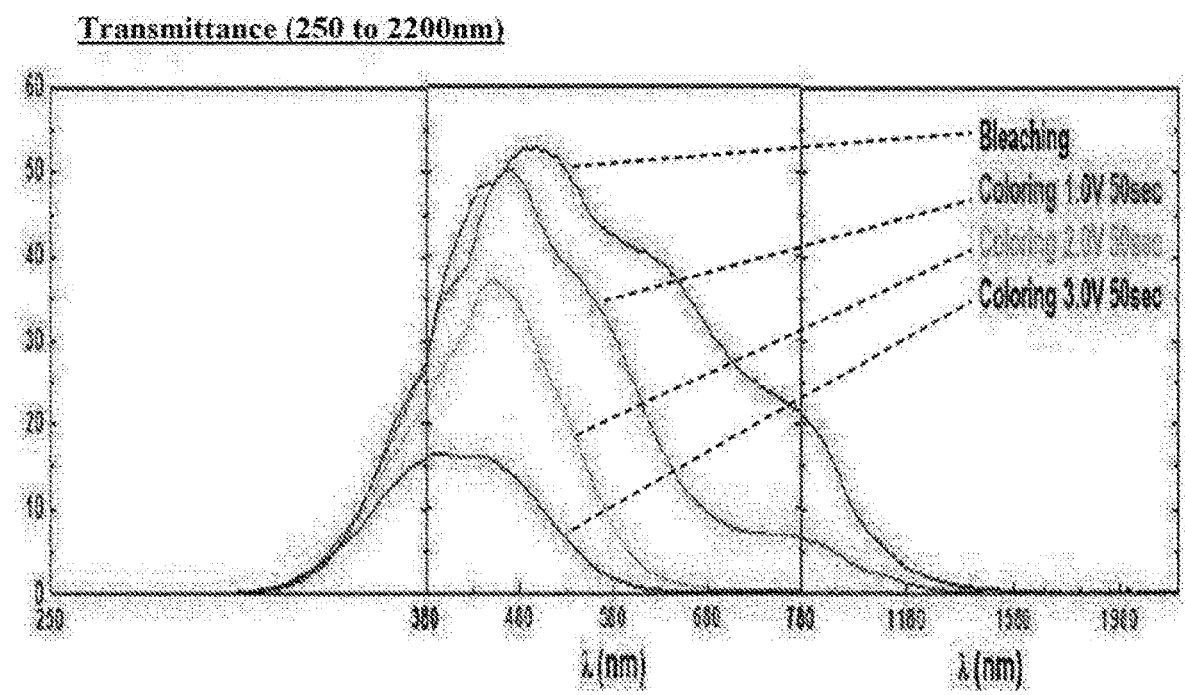

[Figure 5]
100: An electrochromic film
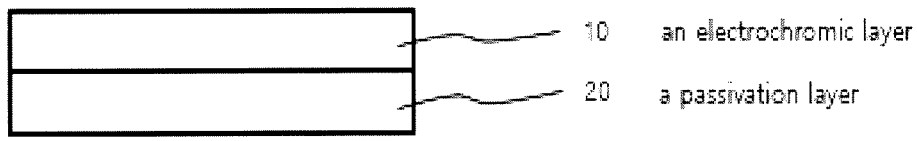
[Figure 6]
1000: An electrochromic device
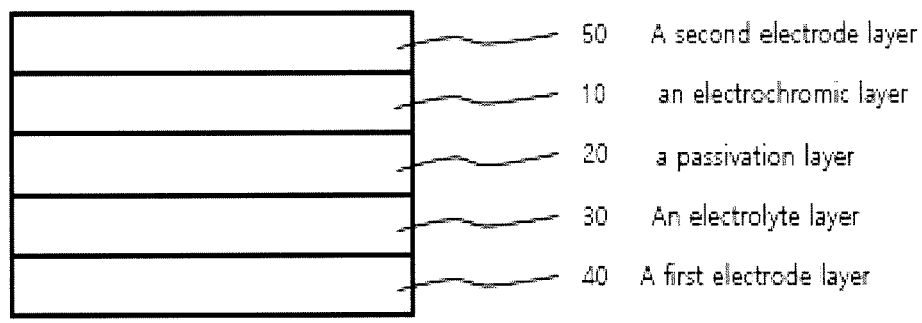
[Figure 7]
1000: An electrochromic device
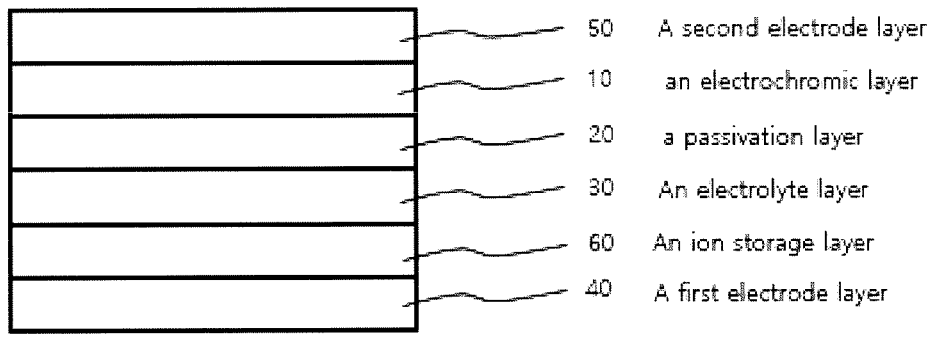

ELECTROCHROMIC FILM AND AN ELECTROCHROMIC DEVICE COMPRISING THE SAME

CROSS-REFERENCE TO RELATED APPLICATIONS

This application claims the benefit of priority based on Korean Patent Application No. 10-2017-0052046 filed on Apr. 24, 2017 and Korean Patent Application No. 10-2018-0045422 filed on Apr. 19, 2018, the disclosures of which are incorporated herein by reference in their entirety.

TECHNICAL FIELD

The present application relates to an electrochromic film and an electrochromic device comprising the same.

BACKGROUND ART

Electrochromism refers to a phenomenon in which an optical property of an electrochromic material is changed by an electrochemical oxidation or reduction reaction, where the device using the phenomenon is referred to as an electrochromic device. The electrochromic device generally comprises a working electrode, a counter electrode and an electrolyte, where optical properties of each electrode can be reversibly changed by an electrochemical reaction. For example, the working electrode or the counter electrode may comprise a transparent conductive material and an electrochromic material in the form of films, respectively, and in the case where a potential is applied to the device, as the electrolyte ions are inserted into or removed from the electrochromic material-containing film and the electrons simultaneously move through an external circuit, the optical property changes of the electrochromic material appear.

Such an electrochromic device is capable of producing devices having a large area with a small cost and has low power consumption. so that it is attracting attention as smart windows or smart mirrors, and other next-generation architectural window materials. However, since it takes a considerable time to insert and/or remove the electrolyte ions for the optical property changes, that is, the color change, of the entire area of a electrochromic layer, there is a disadvantage that the color-switching speed is slow. Such a disadvantage is more remarkable when the transparent conductive electrode has high sheet resistance or when the electrochromic device is required to have a large area.

On the other hand, recently, there is an increasing demand for electrochromic devices and application fields have also been diversified, so that development of a device capable of finely adjusting optical characteristics while having excellent durability is required.

DISCLOSURE

Technical Problem

It is one object of the present application to provide an electrochromic film capable of electrochromism.

It is another object of the present application to provide an electrochromic film having an improved color-switching speed or electrochromic speed.

It is another object of the present application to provide an electrochromic film having excellent durability and an improved usable level.

It is another object of the present application to provide an electrochromic film capable of finely adjusting transmittance.

It is another object of the present application to provide an electrochromic device comprising the electrochromic film.

The above and other objects of the present application can be all solved by the present application which is described in detail below.

Technical Solution

In one example of the present application, the present application relates to an electrochromic film. The electrochromic film may comprise an electrochromic material, and may change optical properties as a result of electrochromism according to an electrochemical reaction. Such electrochromism may occur in one or more layers included in the electrochromic film.

The electrochromic film (100) may comprise an electrochromic layer (10) and a passivation layer (20), as presented in FIG. 5. Specifically, the electrochromic film may comprise an electrochromic layer and a passivation layer positioned on one side of the electrochromic layer. In the present application, the term "on ~" used in connection with positions between components is used in the sense corresponding to "above" or "upper part" and unless otherwise specified, it may also mean the case where the component having a relevant position directly contacts another component and simultaneously exists on the component, and may also mean the case where other components exist between them.

In one example, the electrochromic layer and the passivation layer may have light transmission characteristics. In the present application, the light transmission characteristics may mean a case of being transparent enough to be capable of clearly viewing a change in optical characteristics such as a color change occurring in an electrochromic device, and for example, may mean a case where the corresponding layer has light transmittance of at least 60% or more in a state without any external factor such as potential application (and/or a bleached state). More specifically, the lower limit of the light transmittance of the electrochromic layer and the passivation layer may be 60% or more, 70% or more, or 75% or more, and the upper limit of the light transmittance may be 95% or less, 90% or less, or 85% or less. When the light transmission characteristics in the above range is satisfied, a user can fully observe a change in optical characteristics of the film or device by electrochromism according to potential application, that is, reversible coloring and bleaching. That is, in the case of having light transmission characteristics in an uncolored state, it is suitable for the electrochromic device. Unless otherwise specified, the "light" in the present application may mean visible light in a wavelength range of 380 nm to 780 nm, more specifically visible light having a wavelength of 550 nm. The transmittance can be measured using a known haze meter (HM).

The electrochromic layer may comprise an electrochromic material, that is, an organic material or an inorganic material, which is capable of electrochromism. As the inorganic material, a metal oxide may be used.

In one example, the electrochromic layer may comprise a reducing electrochromic material that undergoes coloration upon a reduction reaction. The type of the usable reducing electrochromic material is not particularly limited, but an inorganic electrochromic material such as an oxide of Ti, Nb, Mo, Ta or W may be used. For example, $WO_3$, $MoO_3$, $Nb_2O_5$, $Ta_2O_5$ or $TiO_2$, and the like may be used.

In another example, the electrochromic layer may comprise an oxidizing electrochromic material that is colored when oxidized. The kind of the usable oxidizing electrochromic material is not particularly limited, but one or more inorganic electrochromic materials selected from an oxide of Cr, Mn, Fe, Co, Ni, Rh or Ir; a hydroxide of Cr, Mn, Fe, Co, Ni, Rh or Ir; and prussian blue may be used. For example, $LiNiOx$, $IrO_2$, $NiO$, $V_2O_5$, $LixCoO_2$, $Rh_2O_3$ or $CrO_3$, and the like may be used.

Without being particularly limited, the electrochromic layer may have a thickness in a range of 50 nm to 450 nm.

The method of forming the electrochromic layer is not particularly limited. For example, the layer may be formed using a variety of known deposition methods.

The passivation layer may mean a layer capable of preventing deterioration of an adjacent layer when a film or an element is driven. The passivation layer may comprise an oxynitride simultaneously containing two or more metals.

In one example, the passivation layer may have an oxynitride simultaneously containing two or more metals selected from Ti, Nb, Mo, Ta and W.

More specifically, the passivation layer may comprise Mo and Ti simultaneously. In this connection, the nitride, oxide or oxynitride containing only Mo has poor adhesion with the adjacent thin film, and the nitride, oxide or oxynitride containing only Ti has poor durability, such as decomposition upon potential application. Particularly, since the nitride or oxynitride containing any one of the metals listed above, for example, Ti alone or Mo alone, has a low light transmission characteristic, such as visible light transmittance of 40% or less, 35% or less, or 30% or less, even in a state where no potential or the like is applied, it is not suitable for use as a member for an electrochromic film which requires transparency upon bleaching. In addition, when a material having a low transmittance as above is used, it is difficult to view a clear optical characteristic change of coloring and bleaching required in an electrochromic device.

In one example, the metal oxynitride included in the passivation layer may be represented by Formula 1 below.

$$Mo_aTi_bO_xN_y \quad \text{[Formula 1]}$$

In Formula 1, a represents an elemental content ratio of Mo, b represents an elemental content ratio of Ti, x represents an elemental content ratio of O, and y represents an elemental content ratio of N, where a>0, b>0, x>0, y>0, 0.5<a/b<4.0, and 0.005<y/x<0.02. In the present application, the term "elemental content ratio" may be atomic % and may be measured by XPS (X-ray photoelectron spectroscopy). When the elemental content ratio (a/b) is satisfied, a passivation layer having excellent adhesion to other layer constitutions as well as durability can be provided. When the elemental content ratio (y/x) is satisfied, the passivation layer may have light transmittance of 60% or more. Particularly, when the elemental content ratio (y/x) is not satisfied, the passivation layer has a very low light transmission characteristic (transparency), such as light transmittance of 40% or less, or 35% or less, and thus the passivation layer cannot be used as a member for an electrochromic device.

In one example, the passivation layer may have a thin film density ($\rho$) of 15 g/cm$^3$ or less. For example, the lower limit of the film density ($\rho$) value may be 0.5 g/cm$^3$ or more, 0.7 g/cm$^3$ or more, or 1 g/cm$^3$ or more, and the upper limit of the film density ($\rho$) value may be 13 g/cm$^3$ or less, or 10 g/cm$^3$ or less. The thin film density may be measured by XRR (X-ray reflectivity).

In one example, the passivation layer may have a thickness of 150 nm or less. For example, the passivation layer may have a thickness of 140 nm or less, 130 nm or less, 120 nm or less, 110 nm or less, or 100 nm or less. When the upper limit of the thickness is exceeded, the insertion or desorption of electrolyte ions may be lowered, and the color-switching speed may be adversely affected. The lower limit of the thickness of the passivation layer is not particularly limited, but may be, for example, 10 nm or more, 20 nm or more, or 30 nm or more. When it is less than 10 nm, the thin film stability is poor.

In one example, the passivation layer may have a visible light refractive index in a range of 1.5 to 3.0 or in a range of 1.8 to 2.8. When the passivation layer has a visible light refractive index in the above range, an appropriate light transmission characteristic in the electrochromic film can be realized.

The method of forming the passivation layer is not particularly limited. For example, the layer can be formed using a variety of known deposition methods.

In the present application, coloration levels of the electrochromic layer and the passivation layer may be different from each other. In the present application, the "coloration level" may mean "a minimum magnitude (absolute value)" of a voltage which can be applied to a layer capable of electrochromism to cause color-change (coloring and/or bleaching), such as the case that while an electrochemical reaction is induced by a voltage of a predetermined magnitude applied to a layer capable of electrochromism or a film comprising the same, and the like, so that the layer capable of electrochromism has a color, the transmittance of the layer or the film is lowered. For example, when a voltage has been applied to the electrochromic film in the order of −0.1V, −0.5V, −1V, and −1.5V at a predetermined time interval and then the electrochromic layer has been colored after application of −1V, the coloration level of the electrochromic layer can be said to be 1V. The fact that the passivation layer has a coloration level different from that of the electrochromic layer means that the passivation layer can also be colored and bleached by the electrochemical reaction like the electrochromic layer, but the minimum magnitude (absolute value) of the voltage causing the coloration of the electrochromic layer and the minimum magnitude (absolute value) of the voltage causing the coloration of the passivation layer are different from each other. In this regard, since the coloration level, that is, the minimum magnitude (absolute value) of the voltage causing the coloration functions as a kind of barrier against the coloration, when a potential smaller than the minimum magnitude (absolute value) of the coloration level of the relevant layer is applied, the coloring of the relevant layer does not actually occur. To this end, as described above, the kind and/or content of the metal contained in the oxide and oxynitride of each layer can be appropriately controlled.

In one example, the coloration level of the passivation layer may have a value greater than the coloration level of the electrochromic layer. For example, when the coloration level of the electrochromic layer is 0.5V, the coloration level of the passivation layer may be 1V. Alternatively, when the coloration level of the electrochromic layer is 1V, the coloration level of the passivation layer may be 2V or 3V. In one example, the coloration level of the electrochromic layer having the above configuration may be 1V.

In one example, only the electrochromic layer in the electrochromic film can be colored. More specifically, when the coloration level of the passivation layer is higher than the coloration level of the electrochromic layer and the intermediate value potential of each layer coloration level is applied to the electrochromic film, the passivation layer having a higher coloration level than the electrochromic layer cannot be colored, and only the electrochromic layer can be colored. For example, the colored electrochromic layer may have light transmittance of 45% or less, or 40% or less, and the non-colored passivation layer may maintain visible light transmittance of 60% or more, or 70% or more. In this case, the light transmittance of the electrochromic film comprising the colored electrochromic layer may be 45% or less, 40% or less, 35% or less, or 30% or less. The lower limit of the light transmittance of a conductive laminate comprising the colored electrochromic layer is not particularly limited, but may be, for example, 20% or more.

In one example, the passivation layer comprising an oxynitride of Formula 1 above may be colored under a voltage application condition of −2V or less, for example, −2.5V or less, or −3V or less. That is, the coloration level of the passivation layer may be 2V, 2.5V or 3V. For example, when voltages of −1.5V and −2.0V are applied to an electrochromic film or a device comprising the same at a predetermined time interval, the passivation layer may be gradually colored from the point when the −2.0V is applied (the coloring can be viewed by the user). The passivation layer satisfying Formula 1 above may be colored with a color of (dark) gray or black series. The coloration level of the passivation layer may vary somewhat in the range of 2V or more, depending on the constitutions which are used together in the electrochromic film.

In one example, monovalent cations may be present in one or more layers of the layer structures constituting the electrochromic film of the present application. For example, the monovalent cations may be present in any one of the passivation layer and the electrochromic layer, or the monovalent cations may be present in both the passivation layer and the electrochromic layer. In the present application. the presence of monovalent cations in any layer included in the electrochromic film is used as a meaning embracing, for example, the case where monovalent cations are included (inserted) in each layer in the form of an ion such as $Li^+$ and the case where the inserted monovalent cations are chemically bonded to the metal oxynitride or the metal oxide to be included in each layer. In the present application, the insertion of monovalent cations can be performed before manufacturing the electrochromic device (formed by laminating an electrolyte layer and the electrochromic film).

In one example, the monovalent cation may be a cation of an element different from the metal contained in the metal oxynitride of the passivation layer or the metal oxide of the electrochromic layer. Without being particularly limited, the monovalent cation may be, for example, $H^+$, $Li^+$, $Na^+$, $K^+$, $Rb^+$ or $Cs^+$. The monovalent cations can also be used as electrolyte ions capable of participating in an electrochromic reaction, for example, coloring or bleaching of an electrochromic layer, as described below. Thus, the presence of monovalent cations in the layer contributes to migration of monovalent cations between the electrolyte and each layer later required for a reversible electrochromic reaction, and makes it possible to omit an initialization operation, as described below.

In one example, when monovalent cations are present in the electrochromic layer, the monovalent cations may be present in a content range of $1.0\times10^{-8}$ mol to $1.0\times10^{-6}$ mol, more specifically, a content range of $5.0\times10^{-8}$ mol to $1.0\times10^{-7}$ mol, per $cm^2$ of the electrochromic layer. When the monovalent cations exist in the content range above, the above-described object can be achieved.

In another example, when monovalent cation are present in the passivation layer, the monovalent cations may be present in a content range of $5.0\times10^{-9}$ mol to $5.0\times10^{-7}$ mol, more specifically, a content range of $2.5\times10^{-8}$ mol to $2.5\times10^{-7}$ mol. per $cm^2$ of the passivation layer. When the monovalent cations exist in the content range above, the above-described object can be achieved.

In the present application, the content of monovalent cations present in each layer, that is, the mole number can be obtained from the relationship between the charge quantity in each layer in which monovalent cations exist and the mole number of electrons. For example, when monovalent cations are inserted into the electrochromic film of the constitutions above using a potentiostat device to be described below and the charge quantity of the passivation layer in the film is A ($C/cm^2$), the value (A/F) of the charge quantity A divided by the Faraday constant F may be a mole number of electrons present per $cm^2$ of the passivation layer. On the other hand, since the electrons ($e^-$) and the monovalent cations can react at a ratio of 1:1, the maximum amount of monovalent cations present in each layer, that is, the maximum mole number may be equal to the mole number of electrons obtained from the above. Regarding the content of monovalent cations, the method of measuring the charge quantity is not particularly limited, and a known method can be used. For example, the charge quantity can be measured by potential step chronoamperometry (PSCA) using a potentiostat device.

In one example, the presence of monovalent cations in some layers of the layer structures constituting the electrochromic film, that is, the insertion of monovalent cations into some layers of the electrochromic film, can be achieved using a potentiostat device. Specifically, monovalent cations may be inserted into the electrochromic film by a method of providing a three-electrode potentiostat device composed of a working electrode, a reference electrode including Ag, and a counter electrode including a lithium foil or the like in an electrolytic solution containing monovalent cations, connecting the electrochromic film to the working electrode and then applying a predetermined voltage. The magnitude of the predetermined voltage applied for the insertion of monovalent cations may be determined in consideration of the degree of the content of monovalent cations included in an electrolyte to be described below, the degree of insertion of monovalent cations required in the electrochromic film, the optical characteristics of the required film or device or the coloration level of the layer capable of electrochromism, and the like.

In another example of the present application, the present application relates to an electrochromic device. The electrochromic device may comprise a first electrode layer, an electrolyte layer, an electrochromic film and a second electrode layer sequentially. A separate layer or another structure may be interposed between the respective constitutions laminated to constitute the device, or the electrochromic device may also be constituted while the above-listed constitutions are directly in contact with each other. The electrochromic film may have the same constitutions as described above.

In one example, the electrochromic device (1000) may be configured, as presented in FIG. 6, such that the passivation layer in the structure of the electrochromic film is positioned closest to the electrolyte layer. More specifically, the electrochromic device may comprise a first electrode layer (30), an electrolyte layer (40), a passivation layer (20), an electrochromic layer (10) and a second electrode layer (50) sequentially.

Without being particularly limited, the first and second electrode layers may have a thickness of 50 nm to 400 nm or less. In addition, the electrode layer may also have light transmittance in a range of 60% to 95%. The first and second electrode layers may each independently comprise a transparent conductive compound, a metal mesh, or an OMO (oxide/metal/oxide).

In one example, the transparent conductive compound used in the electrode layer may be exemplified by ITO (indium tin oxide), $In_2O_3$ (indium oxide), IGO (indium gallium oxide), FTO (fluorodo doped tin oxide), AZO (aluminum doped zinc oxide), GZO (gallium doped zinc oxide), ATO (antimony doped tin oxide), IZO (indium doped zinc oxide), NTO niobium doped titanium oxide), ZnO (zinc oxide) or CTO (cesium tungsten oxide), and the like. However, the material of the transparent conductive compound is not limited to the above-listed materials.

In one example, the metal mesh used for the electrode layer comprises Ag, Cu, Al, Mg, Au, Pt, W, Mo, Ti, Ni or an alloy thereof, which may have a lattice form. However, the material usable for the metal mesh is not limited to the above-listed metal materials.

In one example, the electrode layer may comprise an OMO (oxide/metal/oxide). Since the OMO has lower sheet resistance over the transparent conductive oxide typified by ITO, the improvement of the electrical characteristics of the electrochromic device, such as shortening the color-switching speed of the electrochromic device, can be achieved.

The OMO may comprise an upper layer, a lower layer, and a metal layer located between the two layers. In the present application, the upper layer may mean a layer located relatively farther from the passivation layer among the layers constituting the OMO.

In one example, the upper and lower layers of the OMO electrode may comprise an oxide of Sb, Ba, Ga, Ge, Hf, In, La, Se, Si, Ta, Se, Ti, V, Y, Zn, Zr or an alloy thereof. The types of the respective metal oxides included in the upper layer and the lower layer may be the same or different.

In one example, the upper layer may have a thickness in a range of 10 nm to 120 nm or in a range of 20 nm to 100 nm. In addition, the upper layer may have a visible light refractive index in a range of 1.0 to 3.0 or in a range of 1.2 to 2.8. Having the refractive index and thickness in the above ranges, appropriate levels of optical characteristics can be imparted to the device.

In one example, the lower layer may have a thickness in a range of 10 nm to 100 nm or in a range of 20 nm to 80 nm. In addition, the lower layer may have a visible light refractive index in a range of 1.3 to 2.7 or in a range of 1.5 to 2.5. Having the refractive index and thickness in the above ranges, appropriate levels of optical characteristics can be imparted to the device.

In one example, the metal layer included in the OMO electrode may comprise a low resistance metal material. Without being particularly limited, for example, one or more of Ag, Cu, Zn, Au, Pd and an alloy thereof may be included in the metal layer.

In one example, the metal layer may have a thickness in a range of 3 nm to 30 nm or in a range of 5 nm to 20 nm. In addition, the metal layer may have a visible light refractive index of 1 or less, or 0.5 or less. Having the refractive index and thickness in the above ranges, appropriate levels of optical characteristics can be imparted to the device.

As in the above-described one example of the present application, the electrochromic film comprises an electrochromic layer and a passivation layer. Then, the electrochromic layer may comprise a reducing or oxidizing electrochromic material. In one example, when the electrochromic layer comprises a reducing electrochromic material, two metal components contained in the passivation layer are selected from metals capable of being used in the electrochromic layer, and thus it is believed that the passivation layer and the electrochromic layer included in the electrochromic film have similar physical/chemical properties. Accordingly, when the electrolyte ions are inserted from the electrolyte layer into the electrochromic film, the electrolyte ions can be inserted into the electrochromic layer without disturbance by the passivation layer. The same applies to the case where the electrolyte ions are removed from the electrochromic film or its constituent layer.

It is also determined that the passivation layer improves driving characteristics of the electrochromic device. Specifically, since there is a difference in reactivity or oxidation tendency between the metal components used in each layer, when the migration of the interlayer electrolyte ions is repeated, there may be a problem that the metal used in any layer, for example, the electrode layer or the metal layer is eluted. This problem is more clearly observed when the OMO is used. However, in the present application, since the passivation layer can contain electrolyte ions and it functions as a kind of buffer, it is possible to prevent deterioration of the metal materials used for the electrode layer or the electrochromic film, and the like. Consequently, the electrochromic device of the present application may have excellent durability and improved color-switching speed, and sufficiently improved usable level. Besides, as described below, due to the passivation layer having a coloration level different from that of the electrochromic layer, the present application can more finely adjust the optical characteristics of the electrochromic device.

The electrolyte layer may be a constitution providing electrolyte ions involved in the electrochromic reaction. The electrolyte ion may be a monovalent cation, for example, $H^+$, $Li^+$, $Na^+$, $K^+$, $Rb^+$ or $Cs^+$, which may be inserted into the electrochromic film to participate in the electrochromic reaction.

The type of the electrolyte used in the electrolyte layer is not particularly limited. For example, a liquid electrolyte, a gel polymer electrolyte or an inorganic solid electrolyte may be used without limitation.

The specific composition of the electrolyte used in the electrolyte layer is not particularly limited as long as it can contain a compound capable of providing the monovalent cation, that is, $H^+$, $Li^+$, $Na^+$, $K^+$, $Rb^+$ or $Cs^+$. For example, the electrolyte layer may comprise a lithium salt compound such as $LiClO_4$, $LiBF_4$, $LiAsF_6$ or $LiPF_6$, or a sodium salt compound such as $NaClO_4$.

In another example, the electrolyte layer may further comprise a carbonate compound as a solvent. Since the carbonate-based compound has a high dielectric constant, ion conductivity can be increased. As a non-limiting example, a solvent, such as PC (propylene carbonate), EC (ethylene carbonate), DMC (dimethyl carbonate), DEC (diethyl carbonate) or EMC (ethylmethyl carbonate), may be used as the carbonate-based compound.

In another example, when the electrolyte layer comprises a gel polymer electrolyte, a polymer such as, for example, polyvinylidene fluoride (PVdF), polyacrylonitrile (PAN), polymethylmethacrylate (PMMA), polyvinyl chloride (PVC), polyethylene oxide (PEO), polypropylene oxide (PPO), poly(vinylidene fluoride-hexafluoropropylene) (PVdF-HFP), polyvinyl acetate (PVAc), polyoxyethylene (POE) and polyamideimide (PAI) may be used.

The light transmittance of the electrolyte layer may be in a range of 60% to 95% and the thickness may be in a range of 10 μm to 200 μm, without being particularly limited.

In one example, the electrochromic device (1000) of the present application may further comprise an ion storage layer (60), as presented in FIG. 7. The ion storage layer may mean a layer formed to match charge balance with the electrochromic layer and/or the passivation layer upon a reversible oxidation-reduction reaction for electrochromic of the electrochromic material. The ion storage layer (60) may be positioned between the first electrode layer (40) and the electrolyte layer (30).

The ion storage layer may comprise an electrochromic material having a coloring property different from that of the electrochromic material used in the electrochromic layer. For example, when the electrochromic layer comprises a reducing electrochromic material, the ion storage layer may comprise an oxidizing electrochromic material. Also, the opposite is possible.

Without being particularly limited, the thickness of the ion storage layer may be in a range of 50 nm to 450 nm, and the light transmittance may be in a range of 60% to 95%.

When the electrochromic device comprises two electrochromic materials having different coloring characteristics in separate layers, the respective layers comprising the electrochromic materials must have the same coloring or bleaching state with each other. For example, when the electrochromic layer comprising a reducing electrochromic material is colored, the ion storage layer comprising an oxidizing electrochromic material must also have a colored state, and on the contrary, when the electrochromic layer comprising a reducing electrochromic material is bleached, the ion storage layer comprising an oxidizing electrochromic material must also be in a bleached state. However, as described above, since the two electrochromic materials having different coloring properties do not contain electrolytic ions per se, an operation of matching the colored or bleached state between the layers comprising the respective electrochromic materials is further required. Generally, this operation is called an initialization operation. For example, in the case where transparent $WO_3$, which is colored by reduction but is colorless in itself, is contained in the first layer and Prussian blue colored per se is contained in the second layer (counter layer), the bleaching treatment (reduction treatment) on Prussian blue was conventionally performed by applying a high voltage to the second layer of the electrochromic device which was constituted by laminating the electrode layer, the first layer, the electrolyte layer, the second layer and the electrode layer. However, the initialization operation done at a high potential has a problem of lowering the durability of the device such as causing side reactions in the electrode and the electrolyte layer. On the other hand, in the present application, monovalent cations usable as electrolyte ions may be inserted in advance into the electrochromic film before laminating the respective layer structures for element formation and the electrochromic layer and/or the passivation layer may also be optionally colored, so that the initialization operation as above is not necessary. Therefore, the device can be driven without lowering the durability due to the initialization operation.

In one example, the electrochromic device may further comprise a base material. The base material may be located on a lateral surface of the device, specifically on lateral surfaces of the first and/or second electrode layers.

The base material may also have a light transmission characteristic, that is, light transmittance in a range of 60% to 95%. If the transmittance in the above range is satisfied, the type of the base material to be used is not particularly limited. For example, glass or a polymer resin may be used. More specifically, a polyester film such as PC (polycarbonate), PEN (poly(ethylene naphthalate)) or PET (poly(ethylene terephthalate)), an acrylic film such as PMMA (poly(methyl methacrylate)), or a polyolefin film such as PE (polyethylene) or PP (polypropylene), and the like may be used, without being limited thereto.

The electrochromic device may further comprise a power source. The method of electrically connecting the power source to the device is not particularly limited, which may be suitably performed by those skilled in the art. The voltage applied by the power source may be a constant voltage.

In one example, the power source may alternately apply a voltage at a level capable of bleaching and coloring the electrochromic material for a predetermined time interval.

In another example, the power source may change the magnitude of the voltage applied at predetermined time intervals. Specifically, the power source may apply a plurality of coloring voltages sequentially increasing or decreasing at predetermined time intervals, and apply a plurality of bleaching voltages sequentially increasing or decreasing at a predetermined time interval.

In another example, when the coloration level of the passivation layer is larger than the coloration level of the electrochromic layer, the power source can sequentially apply the coloration level of the electrochromic layer and the coloration level of the passivation layer. In this case, the electrochromic layer is first colored, and then the passivation layer is further colored. Accordingly, the electrochromic device of the present application can achieve light transmittance in a very low level, for example, light transmittance of 10% or less or 5% or less in a colored state up to the passivation layer. That is, for example, if the light transmittance of at least 20% or 15% or so could be realized in the case where only the electrochromic layer and/or the ion storage layer are colored, visible light transmittance of 10% or less, or 5% or less can be realized in the device of the present application colored stepwise up to the passivation layer. The light transmittance of the above level is a value that is difficult to realize realistically in the prior art using only the configuration corresponding to the electrochromic layer and the ion storage layer. Furthermore, in the prior art using only the configuration corresponding to the electrochromic layer and the ion storage layer, it cannot be expected to finely adjust the light transmittance stepwise as in the present application. In addition, in the present application, even if a voltage higher than the coloration level of the electrochromic layer is applied for finely controlling the light transmittance as above, the passivation layer functions as a kind of buffer, so that deterioration of the electrochromic layer can be prevented.

Advantageous Effects

According to one example of the present application, an electrochromic film is provided. The electrochromic film and the electrochromic device comprising the same have improved electrochromism rate as well as excellent durability. In addition, when a film or element according to the present application is used, the optical properties can be adjusted stepwise and finely.

BRIEF DESCRIPTION OF DRAWINGS

FIG. 1 is a graph showing an appearance in which a laminate with a light transmission characteristic comprising a passivation layer of the present application is driven without lowering durability when a voltage of ±5V is applied.

FIG. 2 is a graph relating to driving characteristics of a device. Specifically, FIG. 2(a) is a graph showing an appearance in which the charge quantity of the device of Example 1 changes with increasing cycles, and FIG. 2(b) is a graph showing an appearance in which the charge quantity of the device of Comparative Example 1 changes with increasing cycles.

FIG. 3 is a graph relating to driving characteristics of a device. Specifically, FIG. 3(a) is a graph enlarging and showing changes of electric currents and charge quantities measured according to Example 2 in a specific cycle section (second unit time), and FIG. 3(b) is a graph enlarging and showing changes of electric currents and charge quantities measured according to Comparative Example 2 in a specific cycle section.

FIG. 4 is a graph showing optical characteristics of the electrochromic device of the present application in which the transmittance can be adjusted stepwise according to the applied voltage.

FIG. 5 is a diagram of one embodiment of an electrochromic film (100).

FIG. 6 is a diagram of an embodiment of an electrochromic device (1000).

FIG. 7 is a diagram of an embodiment of an electrochromic device (1000).

BEST MODE

Hereinafter, the present application will be described in detail through Examples. However, the scope of protection of the present application is not limited by Examples to be described below.

Experimental Example 1: Confirmation of Light Transmission Characteristic of Passivation Layer Containing Metal Oxynitride Production Example 1

Production of laminate: ITO having light transmittance of about 90% was formed on one side of glass having light transmittance of about 98%. Thereafter, a layer of an oxynitride ($Mo_aTi_bO_xN_y$) containing Mo and Ti was formed to a thickness of 30 nm on the ITO surface (opposite to the glass position) using sputtering deposition. Specifically, the deposition was performed at a weight % ratio of Mo and Ti targets of 1:1, a deposition power of 100 W and a process pressure of 15 mTorr, and flow rates of Ar, $N_2$ and $O_2$ were 30 sccm, 5 sccm and 5 sccm, respectively.

Measurement of physical properties: The content ratio of each element in the oxynitride layer and the transmittance of the laminate were measured and described in Table 1. The elemental content (atomic %) was measured by XPS (X-ray photoelectron spectroscopy) and the transmittance was measured using a haze meter (solidspec 3700).

Production Example 2

A passivation layer was formed in the same manner as in Production Example 1, except that the flow rate of nitrogen was 10 sccm at the time of deposition and the content ratios were changed as in Table 1.

Production Example 3

A passivation layer was formed in the same manner as in Production Example 1, except that the flow rate of nitrogen was 15 sccm at the time of deposition and the content ratios were changed as in Table 1.

Production Example 4

A passivation layer was formed in the same manner as in Production Example 1, except that the flow rate of nitrogen was 0 sccm at the time of deposition and the content ratios were changed as in Table 1.

Table 1

| | N | Ti | O | Mo | a/b | y/x | Transmittance (%) |
|---|---|---|---|---|---|---|---|
| Production Example 1 | 0.6 ± 0.0 | 13.1 ± 0.2 | 57.3 ± 0.3 | 29.5 ± 0.5 | 2.251908 | 0.0105 | 80 |
| Production Example 2 | 2.7 ± 0.6 | 14.4 ± 0.3 | 44.8 ± 0.9 | 33.0 ± 0.5 | 2.291667 | 0.0603 | 11 |
| Production Example 3 | 3.3 ± 0.4 | 15.5 ± 0.2 | 33.5 ± 0.3 | 33.5 ± 0.4 | 2.16129 | 0.0985 | 5 |
| Production Example 4 | not detected | 15.5 ± 0.2 | 51.6 ± 0.4 | 32.9 ± 0.3 | 2.12 | — | 15 |

From Table 1, it can be deduced that the oxynitride layers of Production Examples 2 to 4 have very low transmittance, but the oxynitride layer containing an oxynitride of Production Example 1 has transmittance of about 90%. The oxynitride layer of Production Example 1 having a high light transmission characteristic is suitable as a member for an electrochromic device.

Experimental Example 2: Confirmation of Electrochromic Characteristics of Passivation Layer The laminate (glass/ITO/oxynitride ($Mo_aTi_bO_xN_y$)) (half-cell) produced in Production Example 1 was immersed in an electrolytic solution containing $LiClO_4$ (1M) and propylene carbonate (PC) and a coloring voltage of −3V and a bleaching voltage of +3V were alternately applied at 25° C. for 50 seconds, respectively. The currents, transmittances and electrochromic times thus measured upon coloring and bleaching are as described in Table 2.

In addition, the measurements were performed for ±4V and ±5V, and the results were described in Table 2.

TABLE 2

| Driving Potential | Charge Quantity ($mC/cm^2$) | Colored | | | Bleached | | | ΔT |
|---|---|---|---|---|---|---|---|---|
| | | Peak Current (mA) | T (%) | Elapsed Time (s) | Peak Current | T (%) | Elapsed Time (s) | |
| ±5 V | 60 | 107 | 30 | 25 | 118 | 61 | 13 | 31 |
| ±4 V | 50 | 88 | 38 | 72 | 92 | 60 | 13 | 92 |
| ±3 V | 40 | 68 | 45 | 19 | 88 | 60 | 17 | 15 |

\* Size of laminate (width x length): 2.5 cm x 10 cm
\* Glass sheet surface: 10Ω/□
\* Charge quantity: measured by potential step chronoamperometry (PSCA) using a potentiostat device.
\* Colored elapsed time (s): the time taken to reach the 80% level of the final coloring state transmittance observed after the elapse (50 s) of the application time of the potential for coloring
\* Bleached elapsed time (s): the time taken to reach the 80% level of the final bleaching state transmittance observed after the elapse (50 s) of the application time of the potential for bleaching
\* Driving potential: a voltage of a predetermined magnitude actually applied for coloring and bleaching of the laminate (half cell). The bleaching potential and the coloring potential are the same in magnitude but different in sign.

As in Table 2, it can be confirmed that the laminate of Production Example 1 has electrochromic characteristics (coloring) depending on the applied voltage. On the other hand, FIG. 1 is a graph recording an appearance in which the laminate of Production Example 1 is driven (electrochromic) when the driving potential is ±5V.

Experimental Example 3: Comparison of the Driving Time (Cycling) and the Usable Level of the Electrochromic Film and the Electrochromic Device Comprising the Same

Example 1

An electrochromic film comprising a $Mo_aTi_bO_xN_y$ layer (passivation layer) having the same elemental content ratio as the oxynitride of Production Example 1, a $WO_3$ layer (electrochromic layer), and an OMO electrode layer sequentially, was produced. 100 ppm of an electrolytic solution containing $LiClO_4$ (1M) and propylene carbonate (PC) and a potentiostat device were prepared and a voltage of −1V was applied for 50 seconds to insert $Li^+$ into the $Mo_aTi_bO_xN_y$ layer and the $WO_3$ layer. It was confirmed that the $WO_3$ layer was colored in a color of blue series. At this time, it was confirmed that the content of $Li^+$ present per $cm^2$ of the $WO_3$ layer was included in the range of $1.0\times10^{-8}$ mol to $1.0\times10^{-6}$ mol, and the content of $Li^+$ present per $cm^2$ of the $Mo_aTi_bO_xN_y$ layer was included in the range of $5.0\times10^{-9}$ mol to $5.0\times10^{-7}$ mol.

Thereafter, a laminate of Prussian blue (PB) and ITO was bonded to the film together via a GPE (gel polymer electrolyte) in the form of a film. The produced electrochromic device has a laminate structure of $OMO/WO_3/Mo_aTi_bO_xN_y/GPE/PB/ITO$.

While a bleaching voltage and a coloring voltage were repeatedly applied to the produced device at a constant cycle, the change in charge quantity of the device with time was observed. The bleaching voltage per cycle was applied at (+) 1.0V for 50 seconds and the coloring voltage was selected in the range of (−) 1.0 to (−) 3V and applied for 50 seconds. The results are as shown in FIG. 2(a).

Comparative Example 1

An electrochromic device was equally produced, except that the $Mo_aTi_bO_xN_y$ layer was not included, and the change in charge quantity of the device was observed in the same manner. The results are as shown in FIG. 2(b).

From FIG. 2(b), it can be confirmed that in the case of the device of Comparative Example, the driving of about 500 cycles is the limit. However, as in FIG. 2(a), it can be confirmed that in the device of Example, no degradation in performance is observed even if it is driven for 2.5 times or more relative to Comparative Example. It is determined that as the $Mo_aTi_bO_xN_y$ layer of the device of Example prevents deterioration of the adjacent OMO or $WO_3$, this is a result in which the durability of the device is improved.

On the other hand, with respect to the electrochromic device, the level at which cycling can be performed in a state where no damage occurs to the device upon driving the device is driven is referred to as a usable level of the device. Unlike Comparative Example, the charge quantity does not decrease in Example comprising the $Mo_aTi_bO_xN_y$ layer even if 1,000 cycling or more is performed, and thus it can be said that the usable level has been improved as compared to Comparative Example 1.

Experimental Example 4: Comparison of Electrochromic Time of the Electrochromic Film and the Electrochromic Device Comprising the Same

Example 2

Using a Solidspec 3700 instrument, the charge quantity and current of the device were measured at the time when the coloring and bleaching change was made to some extent during the experiment performed in Example 1. The results are as shown in FIG. 3(a). In the graph of FIG. 3(a), the X axis means time.

Comparative Example 2

For the device of Comparative Example 1, the charge quantity and current of the device were measured in the same manner as in Example 2. The results are as shown in FIG. 3(b).

Unlike FIG. 3(b), it can be confirmed that FIG. 3(a) shows steep peaks of the charge quantity and the current. Specifically, FIG. 3(b) shows the time required for the charge quantity and the current to converge to a specific value in a range of approximately 20 seconds to 30 seconds, but FIG. 3(a) shows the time within 10 seconds. This means that the color-switching speed in the device of Example is fast as compared to the device of Comparative Example.

Experimental Example 4: Confirmation of Function to Finely Control Transmittance in the Electrochromic Film and the Electrochromic Device Comprising the Same Example 3

For the device of Example 1, −1V, −2V, and −3V were applied stepwise as the coloration level, and 0.5V was applied as a bleaching potential. The transmittance and color at each voltage measured using a Solidspec 3700 instrument are as shown in Table 3 and FIG. 4 below.

TABLE 3

| State | Applied Voltage (V) | Transmittance (%) | Color |
|---|---|---|---|
| Bleaching | 0.5 | 45.74 | ▨ (pastel) |
| Coloring | −1 | 23.12 | ▨ (blue) |
|  | −2 | 6.23 | ■ (dark blue) |
|  | −3 | 3.41 | ■ (greenish blue) |

From Table 3 and FIG. 4, it can be confirmed that the film and the electrochromic device of the present application comprising two layers having different coloration levels have light transmittance capable of being adjusted stepwise, and in particular, when both the electrochromic layer and the passivation layer are colored, they have a very high light blocking property. Specifically, it can be confirmed that while the electrochromic layer comprising $WO_3$ is colored to light blue from the time of −1V application and the passivation layer comprising Mo and Ti is colored to dark gray after the time of −2V application, very low light transmittance is observed.

The invention claimed is:

1. An electrochromic film, comprising:
an electrochromic layer; and
a passivation layer on one side of the electrochromic layer,
wherein the passivation layer can be colored and bleached in use by an electrochemical reaction,
wherein the passivation layer comprises a metal oxynitride that comprises two or more metals selected from Ti, Nb, Mo, Ta and W,
wherein the passivation layer has a coloration level different from a coloration level of the electrochromic layer, and
wherein the coloration level is a minimum magnitude (absolute value) of a voltage which is applied in use to a layer capable of electrochromism to cause color change.

2. The electrochromic film according to claim 1, wherein the coloration level of the passivation layer is higher than the coloration level of the electrochromic layer.

3. The electrochromic film according to claim 1, wherein the electrochromic layer comprises a reducing electrochromic material or an oxidizing electrochromic material.

4. The electrochromic film according to claim 1, wherein the electrochromic layer comprises a reducing electrochromic material and the reducing electrochromic material comprises an oxide of Ti, Nb, Mo, Ta or W.

5. The electrochromic film according to claim 1, wherein the metal oxynitride comprises Mo and Ti.

6. The electrochromic film according to claim 5, wherein the metal oxynitride is represented by Formula 1:

$$Mo_aTi_bO_xN_y \quad \text{[Formula 1]}$$

wherein a represents an elemental content ratio of Mo, b represents an elemental content ratio of Ti, x represents an elemental content ratio of O, and y represents an elemental content ratio of N, where a>0, b>0, x>0, y>0, 0.5<a/b<4.0, and 0.005<y/x<0.02.

7. The electrochromic film according to claim 1, wherein the passivation layer has a thin film density (ρ) of 15 g/cm³ or less.

8. The electrochromic film according to claim 1, wherein the passivation layer has a thickness of 150 nm or less.

9. An electrochromic device comprising a first electrode layer; an electrolyte layer; the electrochromic film according to claim 1; and a second electrode layer sequentially.

10. The electrochromic device according to claim 9, wherein the electrolyte layer, the passivation layer and the electrochromic layer are present sequentially.

11. The electrochromic device according to claim 10, wherein the first electrode layer and the second electrode layer each independently comprise a transparent conductive compound, a metal mesh or an OMO (oxide/metal/oxide).

12. The electrochromic device according to claim 11, wherein the second electrode layer comprises the OMO (oxide/metal/oxide).

13. The electrochromic device according to claim 11, wherein the OMO (oxide/metal/oxide) comprises an upper layer and a lower layer, and the upper layer and the lower layer each independently comprise an oxide of Sb, Ba, Ga, Ge, Hf, In, La, Se, Si, Ta, Se, Ti, V, Y, Zn, Zr or an alloy thereof.

14. The electrochromic device according to claim 13,
wherein the upper layer has a thickness in a range of 10 nm to 120 nm and a visible light refractive index in a range of 1.0 to 3.0, and
wherein the lower layer has a thickness in a range of 10 nm to 100 nm and a visible light refractive index in a range of 1.3 to 2.7.

15. The electrochromic device according to claim 13, wherein the OMO (oxide/metal/oxide) further comprises a metal layer between the upper layer and the lower layer, and the metal layer comprises Ag, Cu, Zn, Au, Pd or an alloy thereof.

16. The electrochromic device according to claim 15, wherein the metal layer has a thickness in a range of 3 nm to 30 nm and a visible light refractive index of 1 or less.

17. The electrochromic device according to claim 9, wherein the electrolyte layer comprises a compound that comprises one or more monovalent cations of $H^+$, $Li^+$, $Na^+$, $K^+$, $Rb^+$ or $Cs^+$.

18. The electrochromic device according to claim 9, further comprising an ion storage layer between the first electrode layer and the electrolyte layer, wherein the ion storage layer comprises an electrochromic material having a coloring property different from that of the electrochromic material contained in the electrochromic layer.

* * * * *